United States Patent [19]

Elter et al.

[11] Patent Number: 4,696,790

[45] Date of Patent: Sep. 29, 1987

[54] PRESTRESSED CONCRETE PRESSURE VESSEL, IN PARTICULAR FOR A NUCLEAR REACTOR INSTALLATION

[75] Inventors: Claus Elter, Bad Duerkheim; Josef Schoening, Hambruecken, both of Fed. Rep. of Germany

[73] Assignee: Hochtemperatur-Reaktorbau GmbH, Dortmund, Fed. Rep. of Germany

[21] Appl. No.: 687,656

[22] Filed: Dec. 31, 1984

[30] Foreign Application Priority Data

Jan. 21, 1984 [DE] Fed. Rep. of Germany ....... 3402055

[51] Int. Cl.$^4$ .................. G21C 13/06; G21C 17/00
[52] U.S. Cl. .................................. 376/296; 376/205; 376/250
[58] Field of Search ............... 376/203, 205, 206, 295, 376/296, 250

[56] References Cited

U.S. PATENT DOCUMENTS

| | | | |
|---|---|---|---|
| 3,503,171 | 3/1970 | Frohly | 220/3 |
| 3,669,303 | 6/1972 | Launay | 376/205 |
| 3,717,352 | 2/1973 | Jansing et al. | 376/206 |
| 3,834,452 | 9/1974 | Costes | 376/205 |
| 3,929,253 | 12/1975 | Johnsson | 376/205 |
| 4,195,457 | 4/1980 | Kissling et al. | 376/205 |

Primary Examiner—Deborah L. Kyle
Assistant Examiner—Richard W. Wendtland
Attorney, Agent, or Firm—Robert J. Koch

[57] ABSTRACT

Disclosed is a prestressed concrete pressure vessel having a vessel opening which is closed by a concrete cover. Two separate gaskets are disposed between the cover and the pressure vessel, and bordering on an annular channel. The annular channel is connected with a gas detector by means of a connecting channel. At the same time, the inner area of the cover rises from the pressure vessel at a slight angle. The vertical prestress by which the cover is pressed down is larger than the force acting against it (the internal pressure). Additionally, the horizontal annular prestress of the cover is larger in its upper region than in the lower region. In this manner, a constant seal is combined with means for monitoring the seal.

8 Claims, 3 Drawing Figures

PRESTRESSED CONCRETE PRESSURE VESSEL, IN PARTICULAR FOR A NUCLEAR REACTOR INSTALLATION

BACKGROUND OF THE INVENTION

1. Field of the Invention

The invention concerns a prestressed concrete pressure vessel, particularly one for a nuclear reactor installation, having at least one vessel opening which is closed by means of a concrete cover held down with the aid of clamping elements, wherein the cover is provided with a bearing surface in its periphery which rests on a corresponding flat support surface of the pressure vessel.

2. Background of the Art

Slight deformations of the vessel wall may occur in prestressed concrete pressure vessels in the course of operations. For this reason special attention must be devoted to the arrangement and sealing of concrete covers which close off passages or openings of the vessel wall to the outside. Even during continuous operation, it is necessary to ensure safe sealing and to allow monitoring of the seal of the cover.

SUMMARY OF THE INVENTION

It is therefore the object of the invention to further develop a prestressed concrete pressure vessel of the aforementioned type so that the tightness of the seal is assured and may be monitored in a simple manner in the event of deformations of the pressure vessel.

This object is attained by a prestressed concrete pressure vessel according to the invention wherein at least two separate annular grooves surrounding the opening of the vessel are provided disposed on the bearing surface, and with gaskets inserted in them; a partition seam formed between the bearing surface and the support surface in the region between the two annular grooves is provided continuously connected with an annular channel; the annular channel is provided with at least one connecting channel leading to the outside; and clamping elements are tightened in such a manner that the concrete cover and particularly the bearing surface elastically conform to prevailing deformations of the pressure vessel and the support surface caused by internal pressure in the pressure vessel.

By means of the two adjacent gaskets surrounding the opening of the vessel in combination with the aforementioned manner of tightening the concrete cover on the support surface, a seal that is not affected by the deformation of the cover and/or the wall of the pressure vessel is obtained. At the same time, it is possible, in view of the arrangement of the annular channel and its connection with the partition seam, to ascertain the effectiveness of the gasket arrangement in a simple manner. The gas entering between the gaskets may be suctioned off through the connecting channel leading to the outside, and contained.

In order to prevent mismatching of the partition seam between the bearing surface and the support surface under stress, it is advisable, according to a further development of the invention, that the bearing surface slope up at a slight angle from the support surface. That is, the bearing surface rises in the shape of a circular cone beginning at the first annular groove adjacent to the vessel opening.

An advantageous measure for achieving the same effect comprises equipping the concrete cover with peripheral annular stressing cables, wherein the annular prestressing is higher in the upper area of the concrete cover than in the lower. Preferably, the prestressing of the cover increases continuously from bottom to top. In this manner, a prestress is created in the concrete cover in which the strength and distribution has the configuration of an outwardly directed vault. Additionally, the prestress counteracts the mismatching of the cover.

In order to be able to continuously monitor the effectiveness of the gasket assembly, it is advantageous to attach a gas detector to the connecting channel. This detector should be suitable for detecting gas originating in the pressured inner space of the pressure vessel. Gas detectors or gas trace detectors of this type are known in the prior art.

A further, particularly preferred embodiment of the invention comprises a plurality of cooling pipes which are arranged in the area of the gaskets, and disposed in the concrete cover and/or the pressure vessel. This prevents thermal overloads and allows seals made of a suitable synthetic plastic material to be used in place of the usual steel or soft iron gaskets. An appropriate plastic material of this type is polytetrafluoethylene.

In order to provide good thermal insulation within the area of the cover and the opening of the vessel, it is advantageous to line the opening with thermal insulation terminating with a gap before a roof insulation. The gap may be filled with an elastic insulation.

Further objects, features and advantages of the present invention will become apparent from the detailed description of preferred embodiments which follows, when considered together with the attached figures of drawings.

BRIEF DESCRIPTION OF THE DRAWINGS

In the drawings.

Identical parts in the individual figures are provided with identical reference symbols.

DESCRIPTION OF PREFERRED EMBODIMENTS

Figure 1:
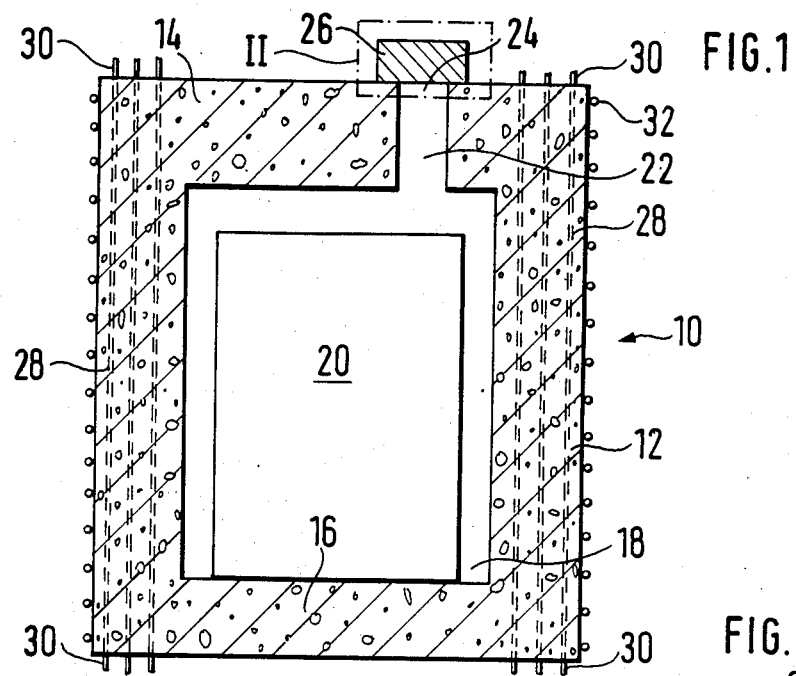
FIG. 1 shows a vertical axial section through the pressure vessel of a nuclear reactor installation in a greatly simplified and reduced representation.

FIG. 1 shows a vertical axial section through a prestressed concrete pressure vessel 10 with a circular outline. The vessel comprises a circular, cylindrical side wall 12, a flat upper closure part 14 and a lower closure part 16. The internal space 18 of the pessure vessel is formed by a cavity. The actual nuclear reactor 20 proper is arranged in said internal space, if need be in a steel pressure vessel.

The upper closure part 14 has a passage 22 with a circular cross section and is directed vertically upward. The opening 24 in the outer wall of the upper closure part 14 is closed off by means of a cover 26.

In order to provide the pressure vessel with the necessary prestressing, a plurality of vertical prestressing cables 28 are provided. The cables pass through the pressure vessel and are provided with suitable clamping devices 30 at the bottom and at the top.

For the horizontal prestressing of the pressure vessel, additional prestressing cables 32 are provided; they surround the periphery of the pressure vessel and are also pretensioned.

Figure 2:
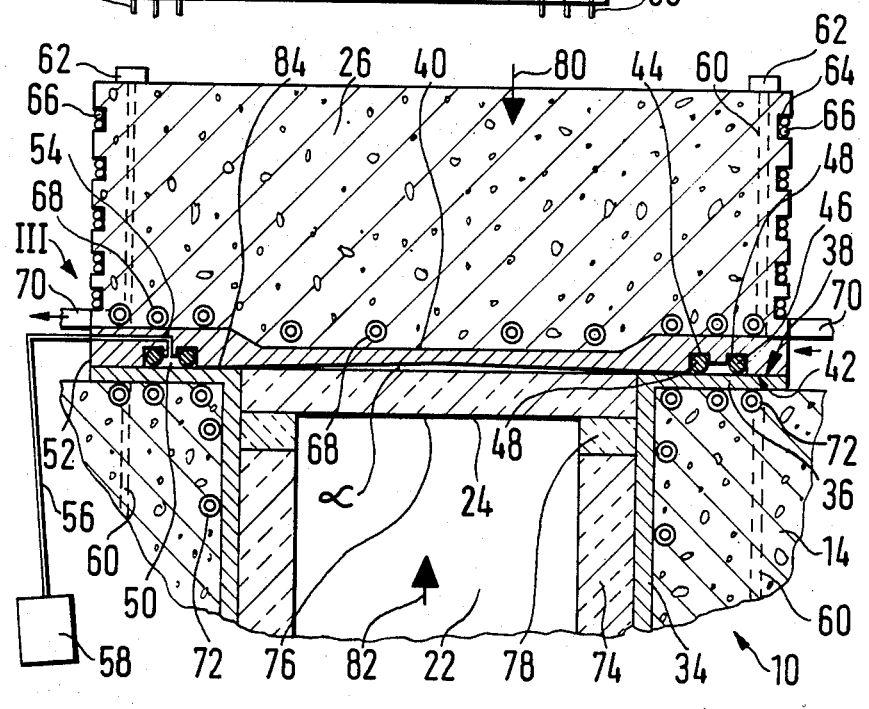
FIG. 2 shows an enlargement of the detail II of FIG. 1.

FIG. 2 shows the area II of FIG. 1 enlarged and in detail. According to the embodiment, the passage 22 is equipped with a steel liner 34 which rests against the concrete of the upper closure part 14. The upper end of this liner 34 is provided with a collar 36 surrounding the edge of the opening 24 and resting on the outer side of the upper closure part 14. The upwardly directed surface of the collar 36 forms the support surface 38, upon which the cover 26 is supported.

In addition, the circular flat cover 26 has a steel closure plate 40 at its lower end. The periphery of the closure plate is fit to the profile of the cover 26. The area of the closure plate 40 resting on the support surface 38 forms the bearing surface 42 of the cover. Both the support surface 38 and the bearing surface 42 are annular in configuration and are finely machined.

The closure plate 40 is thicker in the area of the bearing surface 42 than it is in its inner area. A first annular groove 44 is therefore cut in the bearing surface 42. Said first groove encompasses the vessel opening 24 at a distance and is arranged concentrically with respect to the vessel opening. The first annular groove 44 is surrounded at a distance by a concentric second annular groove 46. Each of the annular grooves 44, 46 has a rectangular cross section. Annular gaskets 48 are arranged in the annular grooves and clamped between the bottom of the grooves and the support surface 38, thus achieving a seal.

The bearing surface 42 is slightly recessed between the two annular grooves 44, 46, so that a concentric annular channels 50 is formed. The partition seam 52 is thus interrupted between the cover and the pressure vessel. The annular channel 50 is joined with a connecting channel 54 which extends radially outward in the closure plate 40 and is connected with a gas detector 58 by means of a pipeline 56. The gas detector 58 is designed so that it detects and indicates the presence of even traces of the gas inside the pressure vessel and in the passage 22. Details of the arrangement and design of the annular grooves 44, 46 and the arrangement of the connecting channel 54 will become more apparent from FIG. 3, described below.

A plurality of vertical clamping elements 60 in the form of prestressing cables are provided in order to press the cover 26 onto the support surface 38 and to hold it down. The clamping elements 60 are anchored in the upper closure part 14. Said elements run through the support surface 38, the bearing surface 42 and the concrete of the cover 26 outside the annular grooves 44, 46. The elements are equipped with clamping members 62, screws for example, at their upper ends. The cover 26 is thereby prestressed and pressed onto the pressure vessel 10. A plurality of clamping members 60 is provided; they are distributed uniformly over the periphery of the concrete cover 26.

Circumferential recesses 64 with rectangular cross sections are provided on the periphery of the concrete cover 26. The annular prestressing cables 66 are inserted in said recesses and apply a horizontal annular prestress to the concrete cover 26 with aid of the clamping members. The annular stress is chosen so that it is lowest at the lower end of the cover and highest at the upper end. The increase in prestressing is preferably uniform. The height of the prestress is achieved by a corresponding tightening of the annular prestressing cables 66 and, if necessary, the number of the annular prestressing cables inserted in the recesses 64 may be increased in the upward direction.

A plurality of cooling pipes 68 is arranged in a concentric and annular configuration in the concrete of the cover 26. The pipes are attached to the closure plate 40 in a thermally conducting manner, by welding for example. The cooling pipes 68 are distributed so that the radial distance between them in the area of the bearing surface 42 is less than in other areas of the cover. The area of the bearing surface 42 is thus cooled very strongly. Each of the cooling pipes 68 is connected with a connecting fitting 70, through which a cooling medium, water for example, may be conducted to and from the cooling pipes.

In a similar manner, the liner 34 of the passage 22 and the collar 36 are equipped with further cooling pipes. Here again, the additional cooling pipes 72 are located in the concrete of the upper closure part 14 and are attached in a thermally conducting manner. In the area of the collar 42 the mutual distance of the additional cooling pipes 72 is small, so that the support surface 38 is being cooled very well. These cooling pipes are again provided with connecting fittings, not shown, for the supply and removal of a cooling medium, particularly water.

The liner 34 is equipped with a cylindrical annular layer of thermal insulation 74 on the inside. The closure plate 40 is provided with insulation 76 in the area of the opening 24. An intermediate space is formed between the frontal side of the thermal insulation 74 and the insulation 76. Said intermediate space is filled with an annular elastic insulation 78. The material for the thermal insulations 74 and 76 may consist of rock wool, while the elastic insulation 78 may be foam rubber. The purpose of the elastic insulation 78 is to prevent the formation of a gap in the case of elongations or deformations of the pressure vessel and/or the cover caused by heat or stress between the thermal insulation 74 and the insulation 76.

Figure 3:
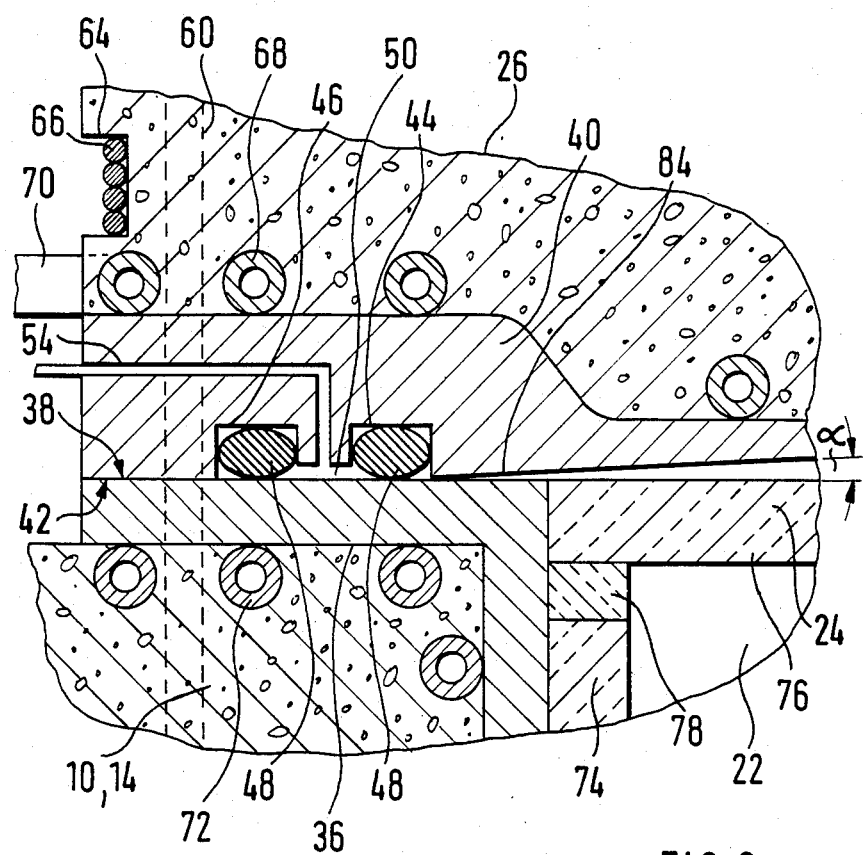
FIG. 3 shows an enlargement of the area III of FIG. 2.

FIG. 3 shows the area III of FIG. 2, enlarged and in detail. The support surface 38 and the bearing surface 42 have annular grooves 44, 46 machined into them and containing the gaskets 48. The originally circular cross section of the gaskets 48 is compressed into an elliptical shape during operation. The annular channel 50, formed between the support surface 38 and a recess of the bearing surface 42, connects the two annular grooves 44 and 48. This allows the space between the two annular grooves 44 and 48 to connect with the outside by means of the connecting channel 54 and to be joined to the gas detector 58. The connecting channel 54 extends initially vertially and then horizontally in the closure plate 40.

It is easily seen from FIG. 3 that the support surface 38 is flat, and that the bearing surface 42 rises at a slight angle from the area of the first annular groove 44 toward the center of the cover, in the form of a circular cone. The formation of a gap of the cover under operating conditions is thereby prevented. The angle is about 2° to 8°, preferably 3° to 5°. Between the root 84 of the rise and the first annular groove an annular area remains, preferably of the width of the annular groove 44, in which the bearing surface 42 and the support surface 38 still rest upon each other.

Although FIG. 1 shows only a single passage 22 with the closure cover 24, further passages with additional covers may be provided if required. These additional passages and covers would be designed and mounted in the manner described hereinabove.

The rise of the annular prestress of the cover 26 from bottom to top is chosen so that the annular prestress at the upper end of the cover is 1.5 to 2.5 times that at the lower end of the cover. Preferably, however, this ratio is 1.6 to 1.8.

The prestress by which the cover 26 is pressed down onto the support surface 38 is chosen as follows. In operation, the internal pressure of the pressure vessel acts with a total force indicated by the arrow 82 on the cover 26 (FIG. 2). It is assumed here that the pressure in the internal space 18, 22 of the pressure vessel is higher than the external pressure. The vertical, downward prestress of the cover 26 must be adjusted so that the force acting downward in the direction of the arrow 80 is larger than the total force in the upward direction (arrow 82). The force in the downward direction is thus always in excess so that the cover is pressured down onto the support surface 38. The cover is therefore able to follow any deformation of the pressure vessel elastically. The downward acting force preferably amounts to 1.3 to 2 times the force acting upwards, particularly 1.3 to 1.5 times. The weight of the cover 26 itself must be taken into consideration in this determination.

In actual operation, the two gaskets 48 seal off the pressurized internal space 18, 22 from the outer space. The sealing action of the gaskets is verified by the annular channel 50 with the corresponding, attached gas detector. If gas enters the annular space 50 from the inside in spite of the inner seal 48, it is conducted to the gas detector through the connecting channel 54 and the pipeline 56. The detector indicates the presence of the gas and may possibly actuate alarm devices so that counter measures may be taken. Intensive cooling in the area of the seals 48 by the cooling pipes 68 and 72 makes it possible to use synthetic plastic gaskets in place of the customary metal seals. The aforementioned measures are favorably augmented by the nature of the annular prestressing of the cover 26 provided by the formation of the angle between the support surface 38 and the bearing surface 42.

Even though only two annular grooves 44, 46 with gaskets are shown in the figures, additional grooves may be provided if necessary. The same is true of the annular channels.

According to one embodiment of the prestressed concrete pressure vessel according to the invention, the dimensions of the pressure vessel are as follows:

The radial width of the support surface 38 is approximately 1/5 to ⅛ of the inner width of the passage 22. The radial distance between the first annular groove 44 and the vessel opening 24 (or the liner 34) is about two to four times the width of the annular groove 44. The annular grooves 44, 46 preferably having the same profile.

The annular gaskets 48 have a circular cross section with a diameter, depending on the size of the cover, of from about 30 to about 100 mm. The depth and width of the annular grooves 44, 46 is adjusted to the diameter of the gaskets. The constant distance between the annular grooves 44, 46 is approximately equal to the width of the grooves. The annular channel 50 extends radially from one annular groove to the other. The depth of the annular channel is about ⅛ to ¼ the depth of the annular grooves 44, 46. The diameter of a cover is about 0.8 to 5 m; the thickness is approximately 0.4 to 0.6 times the diameter.

What is claimed is:

1. A prestressed concrete pressure vessel, for a nuclear reactor installation, comprising:
    a concrete main body having a hollow inside section;
    an opening in the main body which leads from outside the pressure vessel into the inside section;
    thermal insulation disposed against said opening;
    a prestressed concrete cover for closing off said opening, said cover having a periphery of lesser diameter than the main body;
    a support surface surrounding said opening on the main body of the pressure vessel;
    a bearing surface on the periphery of the cover bearing substantially all forces exerted on said prestressed concrete cover, which rests on said support surface, and which defines a seam between itself and said support surface;
    two annular grooves in said bearing surface which encompass said opening;
    a gasket disposed in each of the annular grooves;
    an annular channel in said bearing surface, disposed between the two annular grooves, and being in continuous contact with the seam said annular channel is recessed from said seam between said bearing surface and said support surface;
    at least one connecting channel leading from the annular channel to the outside of the pressure vessel;
    a gas detector associated with said connecting channel;
    a plurality of clamping elements which function to hold down the cover in such a manner that the bearing surface elastically conforms to any deformation of the pressure vessel and support surface which may result from pressure in the inside section.

2. A prestressed concrete pressure vessel according to claim 1, wherein the bearing surface rises at a slight angle away from said opening in the shape of an upwardly converging cone.

3. A prestressed concrete pressure vessel according to claim 1, further comprising a plurality of peripheral annular prestressing cables for prestressing said cover, wherein the prestress is higher away from said bearing surface and lower closer to said bearing surface.

4. A prestressed concrete pressure vessel according to claim 3, wherein the prestress of the cover increases uniformly away from said bearing surface.

5. A prestressed concrete pressure vessel according to claim 1, further comprising a plurality of pipe means for cooling disposed in the concrete cover near the gaskets.

6. A prestressed concrete pressure vessel according to claim 1, further comprising a plurality of pipe means for cooling disposed in the main body of the vessel near the gaskets.

7. A prestressed concrete pressure vessel according to claim 1, further comprising a plurality of pipe means for cooling disposed near said gaskets in both the main body of the vessel and the concrete cover.

8. A prestressed concrete pressure vessel according to claim 1, further comprising first thermal insulation in said opening of the pressure vessel which insulates the cover, second thermal insulation in said opening which insulates the main body of the vessel, and elastic insulation which is disposed between the first and second insulations.

* * * * *